(12) United States Patent
Bajwa et al.

(10) Patent No.: US 7,539,155 B1
(45) Date of Patent: May 26, 2009

(54) CENTRALIZED FEATURE PLATFORM IN A PACKETIZED NETWORK

(75) Inventors: Husnain Bajwa, Austin, TX (US);
Samuel R Shiffman, Austin, TX (US);
J. Michael Holloway, Austin, TX (US)

(73) Assignees: Michael Holloway, Austin, TX (US);
Samuel Shiffman, Austin, TX (US);
UniPont Holdings, Inc.

( * ) Notice: Subject to any disclaimer, the term of this patent is extended or adjusted under 35 U.S.C. 154(b) by 1131 days.

(21) Appl. No.: 09/721,220

(22) Filed: Nov. 22, 2000

Related U.S. Application Data

(60) Provisional application No. 60/225,600, filed on Aug. 15, 2000.

(51) Int. Cl.
*H94B 7/00* (2006.01)

(52) U.S. Cl. .............. 370/310.2; 370/352; 370/400; 370/410; 370/466; 370/475; 455/408; 455/411

(58) Field of Classification Search .......... 379/114.2, 379/114.15; 455/460, 411, 436, 408; 370/310.2–356, 370/400–401, 475, 389, 466, 410; 713/168, 713/169; 709/200
See application file for complete search history.

(56) References Cited

U.S. PATENT DOCUMENTS

| | | | | |
|---|---|---|---|---|
| 5,574,781 A | * | 11/1996 | Blaze | 379/207.15 |
| 5,594,789 A | * | 1/1997 | Seazholtz et al. | 379/88.02 |
| 5,854,975 A | * | 12/1998 | Fougnies et al. | 455/408 |
| 6,097,800 A | * | 8/2000 | McLellan | 379/114.15 |
| 6,141,755 A | * | 10/2000 | Dowd et al. | 713/200 |
| 6,144,723 A | * | 11/2000 | Truchon et al. | 379/88.01 |
| 6,233,235 B1 | * | 5/2001 | Burke et al. | 370/356 |
| 6,426,955 B1 | * | 7/2002 | Gossett Dalton et al. | 370/401 |
| 6,574,321 B1 | * | 6/2003 | Cox et al. | 379/189 |
| 6,614,780 B2 | * | 9/2003 | Hakim et al. | 370/352 |
| 6,639,913 B1 | * | 10/2003 | Frankel et al. | 370/356 |
| 6,728,357 B2 | * | 4/2004 | O'Neal et al. | 379/201.04 |
| 6,760,778 B1 | * | 7/2004 | Nelson et al. | 709/246 |
| 2003/0202521 A1 | * | 10/2003 | Havinis et al. | 370/401 |
| 2005/0232222 A1 | * | 10/2005 | McConnell et al. | 370/349 |

* cited by examiner

*Primary Examiner*—Dwayne Bost
*Assistant Examiner*—Inder P Mehra
(74) *Attorney, Agent, or Firm*—The Law Firm of H. Dale Langley, Jr., P.C.

(57) ABSTRACT

A packetized telecommunication network directs a call that is received at a gateway of the network to connect to a feature platform via the network, which performs a service related to the call, such as an authentication service. After the service is performed, the call is redirected to another location in the network to provide a connection between the gateway and the other location, which connection is independent of the feature platform.

14 Claims, 2 Drawing Sheets

CENTRALIZED FEATURE PLATFORM IN A PACKETIZED NETWORK

CROSS REFERENCE TO RELATED APPLICATIONS

This application claims the benefit of U.S. Provisional Application No. 60/225,600, filed Aug. 15, 2000, which is incorporated herein by reference in its entirety.

BACKGROUND OF THE INVENTION

1. Field of the Invention

This invention relates to packetized telecommunication networks and more particularly to use of a centralized feature platform.

2. Description of the Related Art

When a telecommunication system receives a call, the system often needs to authenticate the call in some manner, to ensure, e.g., the validity of a calling card number, a personal identification number or some other credential associated with the call. Traditionally, in circuit switched telephone networks the standard call flow for an authentication service for a calling card is as follows. Assume a calling card call is received in a telephone network. The call is connected, to a facility having authentication capability, e.g., an Interactive Voice Response (IVR) function that prompts the caller for pertinent information, such as the calling card number and the number the caller is trying to reach. The IVR function either validates the call or drops the call. If the call is validated by the authentication facility, then the call is connected to its calling destination through the authentication function. Thus, as shown in FIG. 1, the facility 101 that validated the call functions as an in-line relay between the call origin 103 and the call destination 105 since the call is still connected through the authentication facility.

While that solution may be acceptable for switched circuit networks (e.g., for telephone systems with class 4 and above circuit switches) which tend to have a lot of "edge centralization" on the network, for emerging packet switched based telephone networks, placing complex functionality in multiple places on the edge of a network can be expensive and therefore undesirable.

Accordingly, it would be desirable to provide the functionality of feature services such as authentication without the cost and complexity of duplicating resources in multiple places in a packet-based telecommunications network.

SUMMARY OF THE INVENTION

Accordingly, in one embodiment, the invention provides a method that includes receiving a call at a gateway of a packetized telecommunication network, directing the call to connect to a feature platform via the network and performing a service related to the call in the feature platform. After the service is performed, the call is transferred to another location in the network to provide a connection between the gateway and the other location, which connection is independent of the feature platform. The service may be an authentication service.

In another embodiment the invention provides a method of authenticating a call received at a packetized voice network comprising receiving the call requiring authentication at any one of a plurality of ingress points for the network, routing the call from the one ingress point to an authentication server, authenticating the call in the authentication server and routing the call to an egress point on the network, instead of the authentication server, after authenticating the call.

In another embodiment, the invention provides a communication network comprising a packet switched network including one or more gateways coupled to receive calls for the network requiring a feature service. The communication network includes a feature platform that is coupled to connect to the calls requiring the feature service received at the one or more gateways, provide the feature service and cause the calls to be redirected to another point on the network after the feature service is provided.

BRIEF DESCRIPTION OF THE DRAWINGS

The present invention may be better understood, and its numerous objects, features, and advantages made apparent to those skilled in the art by referencing the accompanying drawings, in which the use of the same reference symbols in different drawings indicates similar or identical items.

DESCRIPTION OF THE PREFERRED EMBODIMENT(S)

Figure 1:
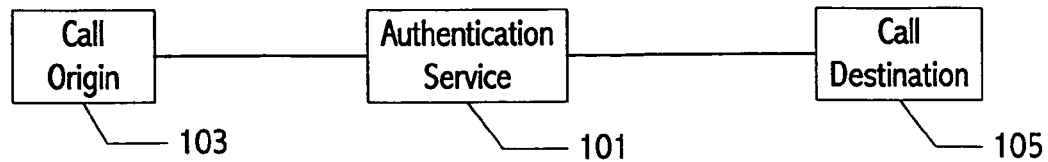
FIG. 1 illustrates the in-line relay connection of a prior art authentication service.
Figure 2:
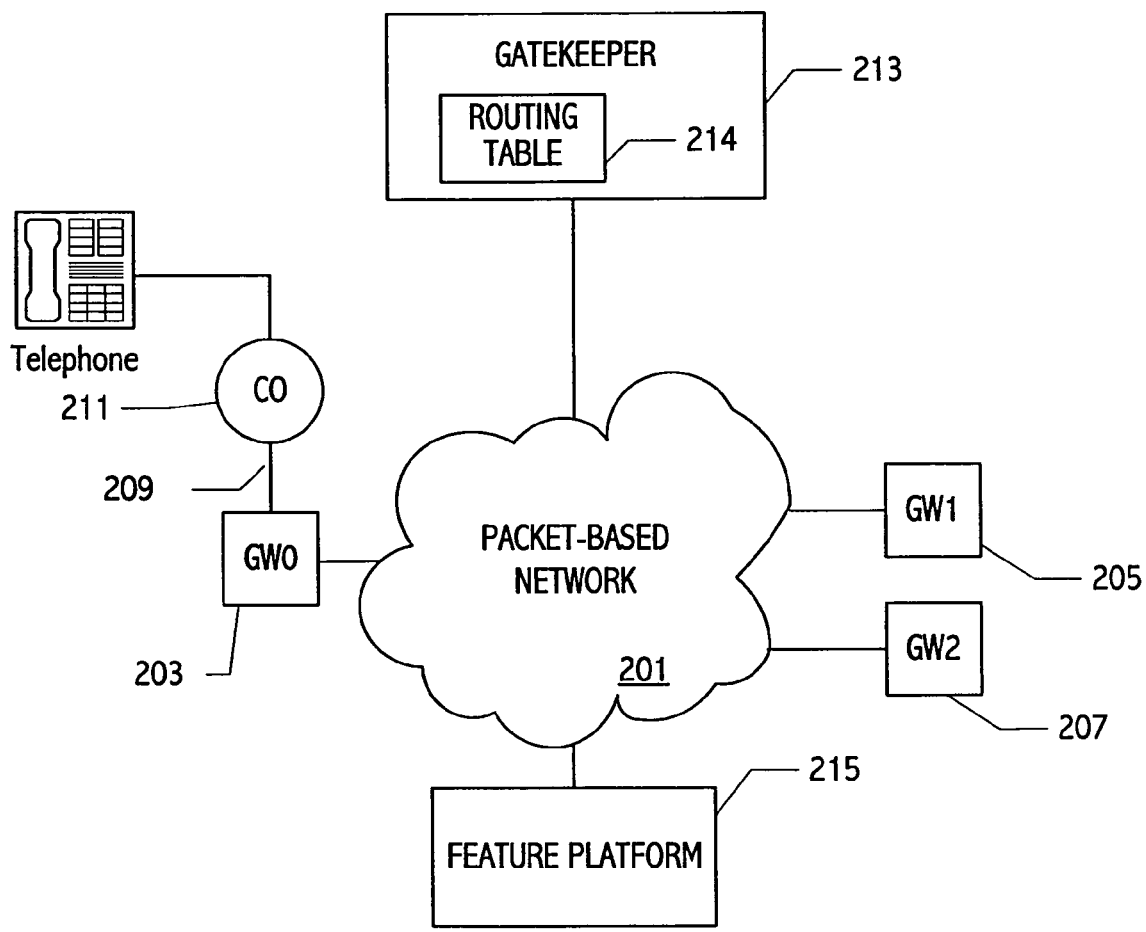
FIG. 2 illustrates a communication network configured with a centralized feature platform for authentication and/or other services.

Referring to FIG. 2, in one embodiment of the invention, a packet-based communication network 201 provides telecommunication services operating in accordance with a communication standard such as the International Telecommunications Union (ITU) H.323 standard, which provides for packet-based multi-media communication including transmission of real-time audio, video, and data communications. The H.323 standard specifies the components, protocols, and procedures providing multi-media communication over a variety of packet-based network including Internet Protocol (IP)-based networks. The H.323 standard can be used for transmission of various combinations of audio, video and data, including audio only (for IP telephony applications, i.e., encoded voice-band traffic); audio and video; audio and data; or audio, video and data. Note that the use of the H.323 standard in the described embodiments is exemplary only. Other emerging or existing standards for packet-based voice, video or data communication, may also be used to implement the teachings described herein.

Referring still to FIG. 2, packet-based network 201 includes a plurality of ingress and egress points identified as gateway 0 (GW0) 203, gateway 1 (GW1) 205 and gateway 2 (GW2) 207. One or more of the gateways, e.g., gateway 203, may be connected via the trunk line 209 to a central office 211 of a public switched telephone network (PSTN). Each gateway 203 provides a connection between the PSTN and packet based network 201. In order to connect the different networks, the gateway has to translate protocols appropriately for call setup and release, and e.g., convert data to and from the various encoding and compression techniques utilized on the different networks (e.g., to and from encoded voice-band traffic of the packet-based network 201). Such gateways are known in the art and utilized for example, in H.323 based networks interfacing to a PSTN. The gateways may also connect one packet-based network to another packet-based network.

In addition to the gateways, exemplary packet based network 201 includes gatekeeper 213. Gatekeeper 213 provides a control function within network 201. For example, gatekeeper 213 may provide such network management services as call routing, addressing, bandwidth management, accounting and billing. Network 201 also includes feature platform 215 which provides a centralized location for feature services. For example, feature platform 215, in one embodiment, provides an authentication service for calls coming into the gateways. Rather than have each gateway have the necessary support to provide various feature services, the present invention provides a centralized location to provide such services. That allows each of the gateways to be less complex and easier to maintain. It is easier to change one or more centralized locations rather than each of the gateways in the system for modifications, upgrades, maintenance and expansion.

Figure 3:
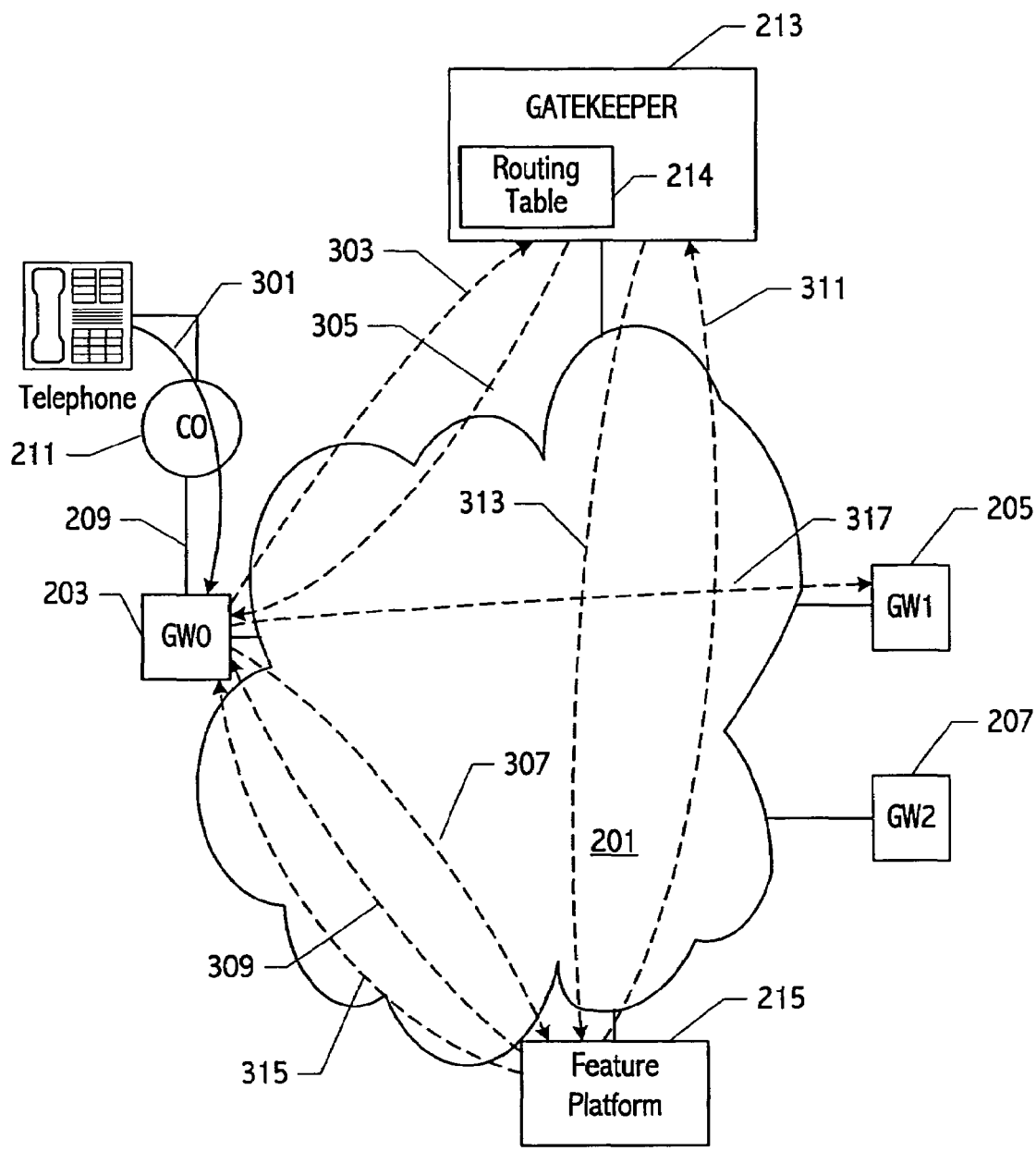
FIG. 3 illustrates a call flow in the system of FIG. 2 according to one embodiment of the invention.

The call flow of an exemplary authentication service will now be described for the network illustrated in FIG. 2. Referring to FIG. 3, assume a calling card call 301 is received at gateway 203 through central office 211. Gateway 203 requests from gatekeeper 213 via query 303 an IP address that corresponds to the 800 number dialed by call 301. Assume in the example that the 800 number is utilized by calling cards. Based on that number, gatekeeper 213, utilizing a routing table 214, informs gateway 203 via packet(s) 305 that the call should be connected to feature platform 215 for authentication. Call 301 is then connected to feature platform 215 via the packet switching network as shown at 307.

Feature server 215 may include such capability as voice prompting that prompts the user to enter needed additional information to complete the authentication process, such as a calling card number. The caller may also be prompted for the destination number if that has not already been entered, as shown at 309. That prompt is routed through the packet-based network to gateway 203, which converts the prompt to an appropriate protocol for the PSTN network. There may be multiple prompts and responses depending on the exact nature of the service provided. For example, the caller may be prompted for a calling card number, a destination number, a credit card, a personal identification number or some other credential required to complete the call. The PSTN provides the responses as DTMF (Dual Tones Multi-Frequency) tones used by touch-tone telephones which are captured by the gateway. The captured DTMF tones are used to validate or reject the call. If validated, DTMF capture is used for the destination number or other information provided by the caller.

Once feature platform 215 has authenticated the call, i.e., determined that the calling card number is legitimate and obtained the destination number, it can disassociate itself from the call. That is, feature platform 215, based on the destination number provided by the calling party, requests appropriate routing information from gatekeeper 213 via packet(s) 311. Gatekeeper 213 responds with packets 313, which include the IP address for the destination number. Assume the destination for the call is a telecommunications network coupled to gateway 205. The call transfer information is provided by feature platform 215 (or by gatekeeper 214) to gateway 203 so the call can be routed to connect gateway 203 to gateway 205 via packet(s) 317. Thus, call 301 is now connected through packet based network 201 to gateway 205 without any need for further participation of feature platform 215 in the link between gateway 203 and gateway 205. Note that the destination for the call could also be internal to network 201 rather than external through gateway 205.

The transfer facility to redirect the call to the other egress point (e.g., gateway 205) from feature platform 215 may utilize a transfer mechanism provided by a number of different underlying protocols. In one environment, the transfer facility provided under H.405.2 may be utilized, which is a supplemental standard for H.323. In a load sharing environment, the transfer facility provided in H.450.3 may be utilized. Transfer capabilities provided by various emerging protocols, such as Simple Gateway Control Protocol (SGCP), Media Gateway Control Protocol (MGCP), Megaco, Session Initiation Protocol (SIP), which is a signaling protocol for Internet conferencing and telephony, or Internet Protocol Device Control (IPDC) protocol, may be used to redirect the call. The particular transfer facility used is not important as long as the functionality of redirecting the call according to the teachings herein is accomplished.

Feature server 215 is no longer needed for the call and thus packets for the remainder of the call are not routed to or through feature server 215. Thus, feature server 215 is available again to provide services requested by any gateway (or any other node on the network) that requires the services provided without having to serve as a relay for the remainder of the authenticated call. While the authentication service may validate the call, which results in redirecting the call to an egress point or other point on the network, it is also possible that the authentication service determines that the call should be dropped. In that case, the feature server informs both the gateway and the gatekeeper.

The authentication service is not limited to calling cards, PIN numbers or other user entered data. In fact, the authentication service may validate that the caller is authorized to access network based on Automatic Number Identification (ANI) information (i.e., the calling number to verify that the number is authorized for a particular type of service. ANI information is used in conventional telephone networks to provide such services as caller ID. For example, a subscriber may subscribe to a long distance service carried over packet-based network 201, the ANI being used to authenticate that the call is from a subscriber.

Other types of services can also benefit from the ability to provide a central intelligent function which can then disassociate itself from the subsequently connected call. Another example of such a service is a follow-me service in which a subscriber is reached at one number regardless of the actual location of the subscriber. Thus, a received call can be routed to a wireline, a cellular number, voice mail, email, pager or other number associated with the called number. The service may implement a time manager for routing. If the feature platform determines that the call should be routed to another location, the call is redirected to that location and feature platform 215 can be disassociated from the call. That is, it does not function as an in-line relay for the call. Additionally, the feature server could be used for a best effort follow-me service, in which the system has a list of possible locations and methodically tries numbers until the subscriber is reached. Also, the feature server can provide a management function capable of being called into and provided a current location for the subscriber.

Other features may be supported by feature platform 215. For example, calls may be routed to different numbers based on time of day, vacation plans or any other of a variety of conditions that can be specified for call routing. Any number that is received that requires special service features can be routed to a centralized feature platform that can provide the services requested. For example, assume a call is received into a gateway over trunk 209. When that call is received, the gateway requests a look-up in the routing table and the call is routed to feature server 215, if the called number is a number associated with a follow-me or other feature service.

In another application, the centralized feature service platform system can also be used for pay-per-stream distribution of media. In such an application, the centralized feature service platform authenticates an endpoint such as a set-top box ordering the particular media such as a movie. Once the endpoint is authenticated, the feature service platform can redirect the connection so a feature service actually providing the streaming media is coupled to the endpoint. Note that the ordering device does not necessarily have to be the endpoint to which the streaming media is directed. In addition, the endpoint may be inside or outside of the network.

A variety of other applications can be supported by a centralized feature server. For example, the centralized feature service platform can provide backend clustering capabilities on messaging services, allowing providers a way of redirecting voice mail/messages to an alias associated with site. It can also setup conferences without centralization when the protocol used supports multiple streams. The feature platform can also be coupled with powerful databases capable of announcing current ratings or prices.

Thus, such feature services as debit/calling card, one number/follow-me, call back service, call screening, student phone home, as well as other similar services commonly offered in the circuit-switched world can advantageously use the centralized feature platform described herein. The centralized feature platform is also useful for call centers since frequently call center agents are not centralized and companies use large PBXs to connect callers and agents.

In one application in which calls originate in the network and are directed to outside the network, for example in a tele-marketing environment, the centralized feature platform can be used to control calling to numbers external to the network. Thus, instead of providing an authentication service for an incoming call into the network, the feature platform provides call control for outgoing calls from the network. The call control include determining what numbers are called. As in previous embodiments, once the calls are connected, the established calls are not routed through the feature platform but redirected for connection independent of the feature platform to an appropriate call agent.

The description of the invention set forth herein is illustrative, and is not intended to limit the scope of the invention as set forth in the following claims. Other variations and modifications of the embodiments disclosed herein, may be made based on the description set forth herein, without departing from the scope and spirit of the invention as set forth in the following claims.

What is claimed is:

1. A method of operating voice traffic bearing packet switched network, comprising the steps of:
   receiving at a gateway of the packet-switched network a call originated from a voice terminal connected to the gateway, the call comprising a call initiation information and the call initiation information comprising a call destination identifier of the packet-switched network for a call destination;
   packetizing the call at the gateway, if the call is not packetized as received by the gateway;
   querying by the gateway over the packet-switched network to a gatekeeper of the packet-switched network, the gatekeeper controls communication of the call over the packet-switched network;
   responding by the gatekeeper to the gateway over the packet-switched network, in respect of the step of querying by the gateway, with a network address of the packet-switched network for a centralized feature platform of the packet-switched network, the centralized feature platform capable of performing a call service for the call;
   directing the call by the gateway, in response to the gatekeeper, over the packet-switched network, to the centralized feature platform having the network address of the packet-switched network for the centralized feature platform;
   determining by the centralized feature platform if the call service should be performed for the call by the centralized feature platform;
      (i) performing the call service by the centralized feature platform for the call, if the centralized feature platform determines that the call service applies for the call;
      (ii) skipping the step of performing the call service if the centralized feature platform determines that the call service does not apply for the call;
   requesting by the centralized feature platform a network routing information of the packet-switched network for the call from the gatekeeper, after the step of performing;
   responding by the gatekeeper with a network destination address of the packet-switched network for the call, whereby if the call is permissible, the network destination address corresponds to the call destination identifier;
   disassociating the call from the centralized feature platform after the step of responding;
   routing the call, disassociated from the centralized feature platform, over the packet-switched network by network protocols, to the network destination address for the call; and
   connected the call if the call is permitted, by the packet-switched network per network protocols of the packet-switched network via the network destination address for the call destination identifier, between the gateway and a target device corresponding to the call destination.

2. The method of claim 1, wherein the call initiation information comprises a telephone number of the target device.

3. The method of claim 2, wherein the telephone number is a PSTN call number and the target device is a second voice terminal.

4. The method of claim 1, wherein the target device is a second gateway, communicatively connected to a second voice terminal.

5. The method of claim 4, wherein the call initiation information comprises a telephone number of the second voice terminal and the second voice terminal is communicatively connected outside the packet-switched network to the second gateway.

6. The method of claim 1, further comprising the steps of:
   directing a plurality of calls received at a plurality of respective gateways, in response to the gatekeeper, to the centralized feature platform for the call service.

7. The method of claim 6, further comprising the steps of:
   providing the centralized feature platform with capability to perform a plurality of different call services; and
   performing at least one of the plurality of different call services for each respective call directed to the centralized feature platform, if the centralized feature platform determines that the at least one of the plurality of different call services should be performed for the call.

8. A method of operating voice traffic bearing packet switched network, the method comprising the steps of:
   receiving at a gateway to the packet-switched network, an information stream including encoded voice-band traffic of a call, the information stream comprising a destination identifier for a target device for voice traffic between the gateway and the target device;

querying by the gateway to a gatekeeper, the gatekeeper routes the call on the packet-switched network;

responding by the gatekeeper to the gateway, with a network address for a centralized feature platform;

directing the call to the centralized feature platform;

authenticating a credential associated with the call, to determine whether a call service should be provided for the call by the centralized feature platform;

upon authentication, performing the call service for the call by the centralized feature platform;

disassociating the centralized feature platform from the call after the step of performing the call service;

routing the call, after the step of disassociating, via the packet-switched network, unless the call service terminates the call, to either: (i) connect the call to the target device of the destination identifier via a network address for the target device, over the packet-switched network, and (ii) connect the call to a separate device via a network address for the separate device, over the packet-switched network.

9. The method of claim 8, wherein the next information stream includes the destination identifier.

10. The method of claim 9, further comprising the step of: communicatively connecting a recipient voice terminal to the target device, based on the destination identifier.

11. The method of claim 10, further comprising the step of: receiving a voice message at the recipient voice terminal, corresponding to at least a portion of the next information stream.

12. A method of operating voice traffic bearing packet switched network, comprising the steps of:

receiving at a gateway to the packet-switched network, a call comprising an information stream representable by encoded voice-band traffic, the information stream originating from a voice terminal communicatively connected to the gateway and the information stream comprising an identifier of a second voice terminal for receipt of the call;

directing by the gateway an encoded voice-band traffic, corresponding to at least a portion of the information stream, over the packet-switched network to a gatekeeper, the gatekeeper capable of routing the call;

authenticating the call by the gatekeeper for a call service, via the encoded voice-band traffic;

upon authentication of the call by the gatekeeper for the call service, directing the call to a centralized feature platform;

performing the call service for the call by the centralized feature platform;

disassociating the centralized feature platform from the call after the step of performing the call service;

next directing the encoded voice-band traffic of the call over the packet-switched network to a target device, wherein the packet-switched network routes the encoded voice-band traffic of the call via the identifier for the second voice terminal;

further receiving at the gateway a next information stream representable by next encoded voice-band traffic, the next information stream originating from the voice terminal communicatively connected to the gateway;

next directing at least a portion of a next encoded voice-band traffic, corresponding to at least a portion of the next information stream, by the packet-switched network to the target device via the identifier;

receiving at least a portion of the next information stream at the second voice terminal communicatively connected to the target device, over the packet-switched network.

13. A method of servicing a packetized data voice call made over a packet-switched network, the network routes the packetized data voice call per network protocols and addresses, comprising the steps of:

initiating the packetized data voice call at a gateway to the network, the voice call includes an identifier of a call recipient;

receiving that call at a gatekeeper router of the network;

directing the packetized data voice call via the network, in response to the gatekeeper router, from the gateway to a centralized feature server capable of a call service for the packetized data voice call;

determining by the centralized feature server whether the packetized data voice call is appropriate for the call service, based on a caller information from the gateway;

if the packetized data voice call is determined as appropriate for the call service, performing the call service for the packetized data voice call by the centralized feature server;

disassociating the centralized feature server from the packetized data voice call after the step of performing the call service, if appropriate for the packetized data voice call;

if the packetized data voice call is determined as not appropriate for the call service, disassociating the centralized feature server from the packetized data voice call after the step of determining the packetized data voice call is not appropriate for the call service;

routing the voice call by the network after the step of disassociating, from the gateway to a destination address of the network for the identifier; and connecting the call between the gateway and the destination address by the packet-switched network via the destination address.

14. The method of claim 13, further comprising the steps of:

providing the centralized feature server with capability to perform a plurality of different call services; and performing at least one of the plurality of different call services for each respective packetized data voice call directed to the centralized feature server, if the centralized feature server determines that the packetized data voice call is appropriate for the at least one of the plurality of different call services.

* * * * *